United States Patent
Okazaki et al.

(10) Patent No.: US 7,791,246 B2
(45) Date of Patent: Sep. 7, 2010

(54) AXIAL MOTOR

(75) Inventors: Toru Okazaki, Osaka (JP); Shingo Ohashi, Osaka (JP); Hidehiko Sugimoto, Fukui (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 404 days.

(21) Appl. No.: 11/996,798

(22) PCT Filed: Apr. 17, 2006

(86) PCT No.: PCT/JP2006/308015

§ 371 (c)(1),
(2), (4) Date: Jan. 25, 2008

(87) PCT Pub. No.: WO2007/013206

PCT Pub. Date: Feb. 1, 2007

(65) Prior Publication Data

US 2010/0141060 A1    Jun. 10, 2010

(30) Foreign Application Priority Data

Jul. 28, 2005    (JP)    ............... 2005-219243

(51) Int. Cl.
*H02K 1/22*    (2006.01)
(52) U.S. Cl. .................................................. 310/268
(58) Field of Classification Search ............. 310/268, 310/266
See application file for complete search history.

(56) References Cited

U.S. PATENT DOCUMENTS 5,945,766 A * 8/1999 Kim et al. .................... 310/268
5,982,070 A * 11/1999 Caamano ............. 310/216.047
6,005,320 A * 12/1999 Kim et al. .............. 310/156.36
6,373,162 B1 * 4/2002 Liang et al. ............. 310/156.53
6,720,688 B1 * 4/2004 Schiller ........................ 310/64
7,598,647 B2 * 10/2009 Okazaki et al. ............. 310/171
2007/0046124 A1 * 3/2007 Aydin et al. ............ 310/156.37

FOREIGN PATENT DOCUMENTS

JP    51-134811    11/1976

(Continued)

*Primary Examiner*—Nguyen N Hanh
(74) *Attorney, Agent, or Firm*—Drinker Biddle & Reath LLP

(57) ABSTRACT

An axial motor includes an armature side stator (13), a pair of rotors, and a pair of stators, which are arranged with gaps left therebetween in the axial direction of a drive shaft (34). The armature side stator (13) includes armature coils (24). The pair of rotors are a first rotor (12) and a second rotor (14) that are arranged on both sides of the stator (13) and include inducers (20, 21, 27, 28). The pair of stators are a first field side stator (11) and a second field side stator (16) that are arranged respectively on oppositely spacing sides of the first rotor and the second rotor. The first and second rotors (12, 14) are mounted to the drive shaft (34). The first and second field side stators (11, 15) include respectively first and second field coils (18, 31) arranged in a toric form about the axis of the drive shaft (34). The first and second field coils (18, 31) are supplied with currents in opposed directions such that magnetic fluxes are generated in the first and second field coils (18, 31) in opposed directions.

4 Claims, 7 Drawing Sheets

FOREIGN PATENT DOCUMENTS

| | | |
|---|---|---|
| JP | 54-116610 | 9/1979 |
| JP | 06-038418 | 2/1994 |
| JP | 06-086517 | 3/1994 |
| JP | 11-318066 | 11/1999 |
| JP | 2005-513197 | 10/2000 |

* cited by examiner

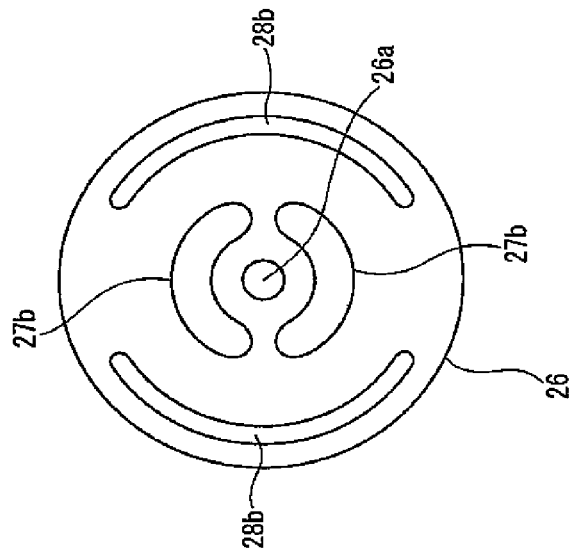
FIG. 5(A)  FIG. 5(B)  FIG. 5(C)
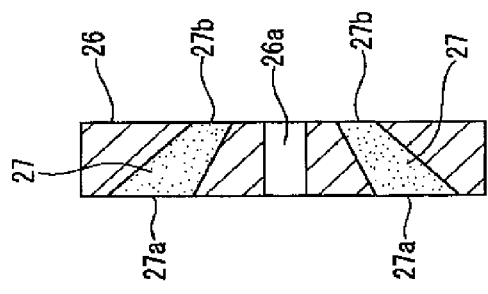
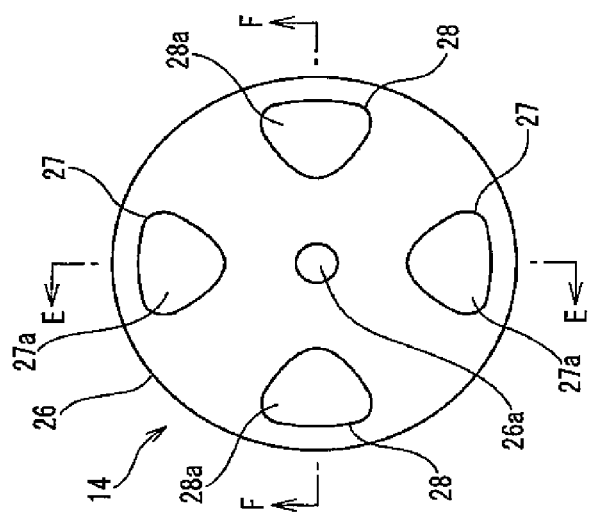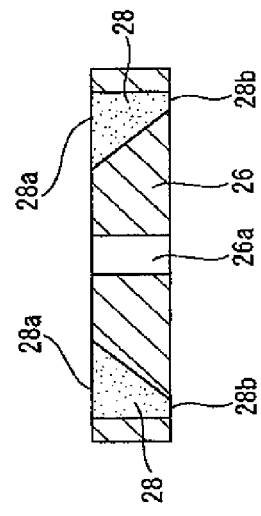
FIG. 5(D)

AXIAL MOTOR

TECHNICAL FIELD

The present invention relates to an axial motor, and more particularly to a motor provided with inductors which are each made of a magnetic material and induce magnetic fluxes on the field magnet side to respective desired positions, the motor having a drive shaft rotated in synchronization with polarity changes of an armature.

BACKGROUND ART

In known power generators disclosed in Japanese Unexamined Patent Application Publication No. 54-116610 and No. 6-86517, as shown in FIG. 8, the entirety of a rotor is constructed by penetrating a drive shaft 1 through a bracket 2 serving as an outer casing with bearings 3 interposed therebetween, arranging a field winding 5 around an outer periphery of a yoke 4 which is externally fitted over and fixed to the drive shaft 1, and arranging claw poles 6 and 7 which are alternately projected from the left and right sides of the field winding 5. On the other hand, a stator winding 8 is attached to the bracket 2 in an opposed relation to the claw poles 6 and 7. Further, electric power supply to the field winding 5, i.e., power feeding, is performed through a slip ring 9 in a sliding way.

In the above-described construction, it is here thought that, by supplying a DC current to the field winding 5 through the slip ring 9, an N pole is generated on the right side of the field winding 5, as viewed on the drawing, and an S pole is generated on the left side of the field winding 5, as viewed on the drawing. In such a case, the N pole is induced in the claw pole 6 projecting from the right side, and the S pole is induced in the claw pole 7 projecting from the left side. Stated another way, by providing only one field winding 5 which is wound about the drive shaft 1, a plurality of N poles and S poles can be alternately generated in the circumferential direction around an outer periphery of the rotor.

There is also known a motor provided with inductors, similarly to the above-described construction of the power generator.

However, because the field winding 5 is formed as a part of the rotor and power feeding to the field winding 5, which is rotated, has to be performed through the slip ring 9, i.e., the sliding contact, the structure is complicated. Further, the useful life is shortened due to contact wear of the slip ring 9. Still another problem is that if the sliding contact at the slip ring 9 is unstable, the power feeing also becomes unstable.

Patent Document 1: Japanese Unexamined Patent Application Publication No. 54-116610
Patent Document 2: Japanese Unexamined Patent Application Publication No. 6-86517

DISCLOSURE OF THE INVENTION

Problems to be Solved by the Invention

In view of the above-described problems, an object of the present invention is to simplify a structure for power feeding to a coil, etc. in a motor, and to reduce leakage fluxes, thereby reducing energy loss.

Means for Solving the Problems

To solve the above-described problems, the present invention provides an axial motor comprising an armature side stator, a pair of first rotor and second rotor arranged on both sides of the armature side stator and including inductors, and a pair of first field side stator and second field side stator arranged respectively on oppositely spacing sides of the first rotor and the second rotor, which stators and rotors are arranged with gaps left therebetween in an axial direction of a drive shaft, the first and second rotors being mounted to the drive shaft, wherein the armature side stator includes a plurality of armature coils arranged at intervals in a circumferential direction, wherein the first and second field side stators include respectively first and second field coils arranged in a toric form about an axis of the drive shaft, the first and second field coils being supplied with currents in opposed directions, wherein the first rotor includes a first inductor made of a magnetic material and having one end surface positioned to face the armature coil and the other end surface positioned to face the outer peripheral side of the first field coil, and a second inductor made of a magnetic material and having one end surface positioned to face the armature coil and the other end surface positioned to face the inner peripheral side of the first field coil, the first inductor and the second inductor being alternately arranged in the circumferential direction, wherein the second rotor includes a third inductor made of a magnetic material and having one end surface positioned to face the other end surface of the armature coil and the other end surface positioned to face the inner peripheral side of the second field coil, and a fourth inductor made of a magnetic material and having one end surface positioned to face the other end surface of the armature coil and the other end surface positioned to face the outer peripheral side of the second field coil, the third inductor and the fourth inductor being alternately arranged in the circumferential direction, and wherein the first and second field coils included in the first and second field side stators generate magnetic fluxes in opposed directions.

With the constitution described above, since the field coils and the armature coils are both attached to the stators, a sliding member such as a slip ring is no longer required for the power feeding to the coils. Accordingly, the power feeding structure can be simplified. It is also possible to avoid the problems of shortening in the motor life and instability in the power feeding, which are caused due to contact wear at the slip ring, etc.

Further, since currents are supplied to the first field coil and the second field coil in opposed directions, magnetic fluxes are also generated in opposed directions by energization of the first field coil and the second field coil. Even with the energization of the two first and second field coils, therefore, the generated magnetic fluxes can be prevented from leaking around both the field coils. Hence, leakage fluxes can be reduced and energy loss can also be reduced.

Preferably, the field coils or/and the armature coils are made of a superconducting material.

With that constitution, since the field coils or/and the armature coils are made of a superconducting material, larger currents can be supplied to the coils without a fear of evolution of heat. Accordingly, the intensity of generated magnetic fluxes can be greatly increased and a higher output can be produced.

Further, since a large current density is obtained as a result of using the superconducting material, the sizes of the field members and the armature coils can be reduced, thus resulting in a smaller-sized and lighter-weight motor.

For example, bismuth and yttrium based high temperature superconducting wires can be preferably used as the superconducting material.

Preferably, each of the inductors has the same sectional area in a direction perpendicular to the axial direction.

With that constitution, magnetic fluxes are less apt to saturate within the inductors. Therefore, the magnetic fluxes generated by the field coils can be efficiently introduced to the armature coil side and the rotors can be rotated with higher efficiency.

In addition, preferably, the first to fourth inductors have substantially the same sectional area.

With that constitution, since the sectional areas of the inductors are even, attractive forces/repulsive forces generated with respect to the armature coils become uniform and balance in rotations of the rotors can be stabilized.

ADVANTAGES

As is seen from the above description, according to the present invention, since the field coils and the armature coils are both attached to the stators, a sliding member such as a slip ring is no longer required for the power feeding to the coils. Accordingly, the power feeding structure can be simplified. It is also possible to avoid the problems of shortening in the motor life and instability in the power feeding, which are caused due to contact wear at the slip ring, etc.

Further, since currents are supplied to the first field coil and the second field coil in opposed directions, magnetic fluxes are also generated in opposed directions by energization of the first field coil and the second field coil. Even with the energization of the two first and second field coils, therefore, the generated magnetic fluxes can be prevented from leaking around both the field coils. Hence, leakage fluxes can be reduced and energy loss can also be reduced.

BRIEF DESCRIPTION OF THE DRAWINGS

FIG. 2 shows a first field side stator; specifically

FIG. 3 shows a second field side stator; specifically

FIG. 4 shows a first rotor; specifically

FIG. 5 shows a second rotor; specifically FIG. 5(A) is a front view, FIG. 5(B) is a sectional view taken along a line E-E, FIG. 5(C) is a rear view, and FIG. 5(D) is a sectional view taken along a line F-F.

Figure 1B:
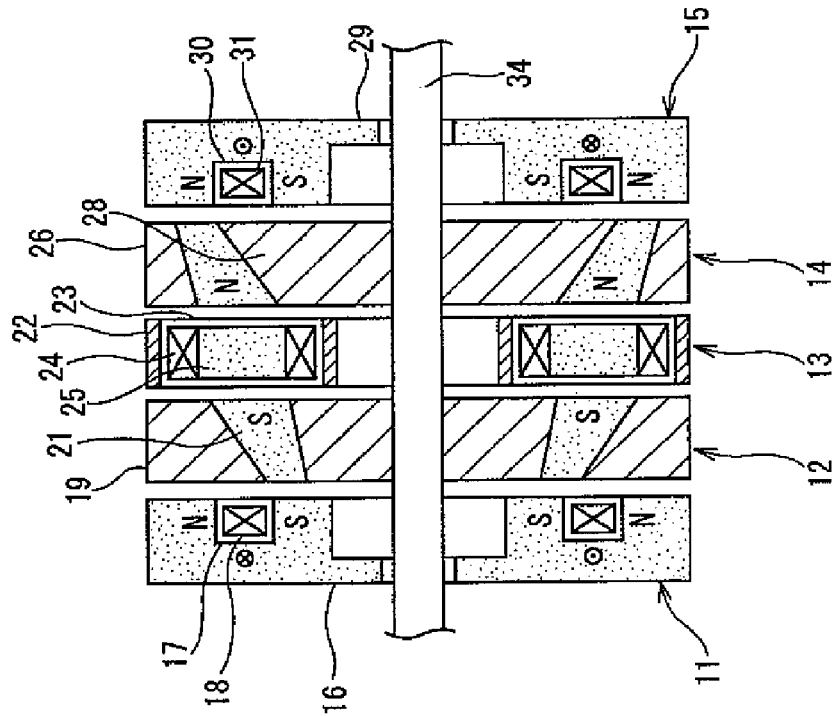
FIG. 1(B) is a sectional view showing the motor in a position rotated 90° from FIG. 1(A).

REFERENCE NUMERALS 10 axial motor
11 first field side stator
12 first rotor
13 armature side stator
14 second rotor
15 second field side stator
18 first field coil
20 first inductor
21 second inductor
24 armature coil
27 third inductor
28 fourth inductor
31 second field coil
34 drive shaft

BEST MODE FOR CARRYING OUT THE INVENTION

An embodiment of the present invention will be described with reference to the drawings.

FIGS. 1 through 6 show the embodiment of the present invention. In an axial motor 10 provided with inductors, a drive shaft 34 penetrates through a first field side stator 11, a first rotor 12, an armature side stator 13, a second rotor 14, and a second field side stator 15 successively in the order named. The first and second field side stators 11, 15 and the armature side stator 13 are each fixed to an installation surface G with a gap left relative to the drive shaft 34. The first and second rotors 12, 14 are externally fitted over and fixed to the drive shaft 34.

Figure 2A:
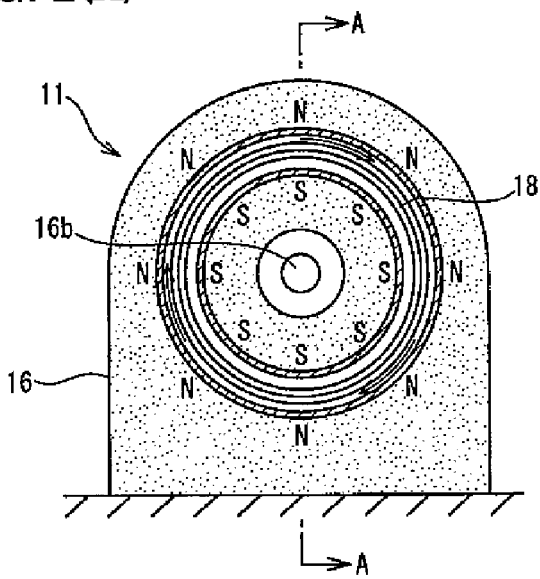
FIG. 2(A) is a front view and FIG. 2(B) is a sectional view taken along a line A-A.
Figure 2B:
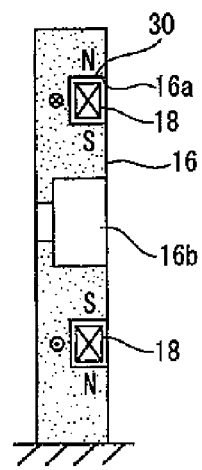
Figure 3A:
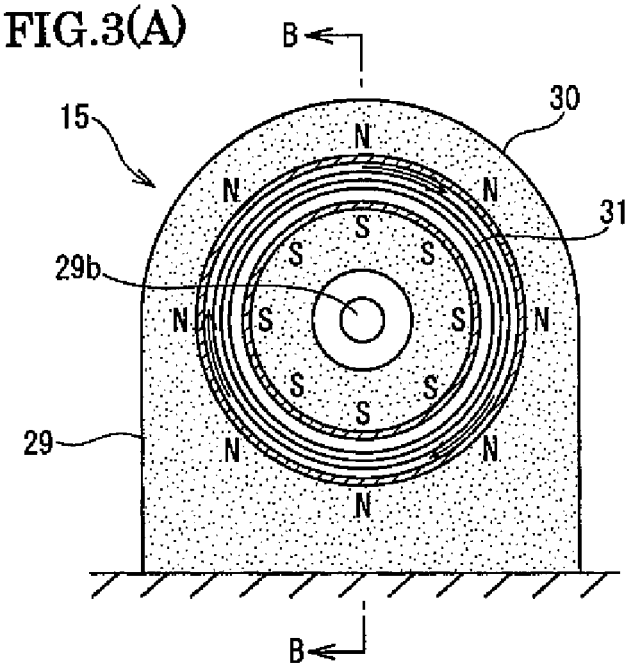
FIG. 3(A) is a front view and FIG. 3(B) is a sectional view taken along a line B-B.
Figure 3B:
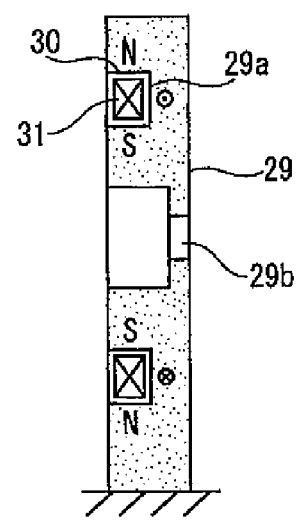

As shown in FIGS. 2 and 3, the first field side stator 11 and the second field side stator 15 are bilaterally symmetric.

The first and second field side stators 11, 15 include respectively yokes 16, 29 which are fixed to the installation surface G and are each made of a magnetic material, heat-insulated coolant containers 17, 30 which have a vacuum heat-insulated structure and are embedded in the yokes 16, 29, and first and second field coils 18, 31 which are windings made of superconducting wires and are held in the heat-insulated coolant containers 17, 30.

Figure 1A:
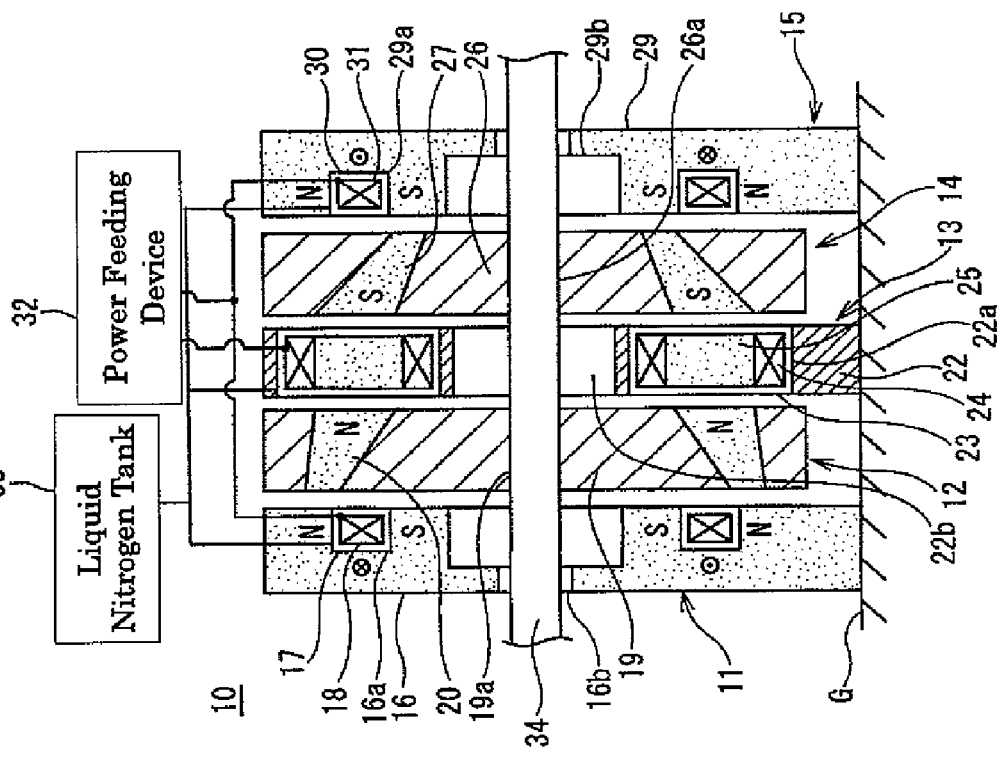
FIG. 1(A) is a sectional view of an axial motor according to an embodiment of the present invention.

As shown in FIGS. 2(A) and 3(A), in a state looking at the first and second field side stators 11, 15 from the front side where the first and second field coils 18, 31 are arranged, a current is supplied to each of the first and second field coils 18, 31 in the clockwise direction. Because the first field side stator 11 and the second field side stator 15 are arranged with the field coils positioned to face each other, as shown in FIG. 1, currents are supplied to the first field coil 18 and the second field coil 31 in opposed directions.

The yokes 16, 29 of the first and second field side stators 11, 15 have respectively loose-fit holes 16b, 29b which are bored at yoke centers in size larger than the outer diameter of the drive shaft 34, and grooves 16a, 29a which are recessed in the toric form about the loose-fit holes 16b, 29b. The first and second field coils 18, 31 are held respectively in the heat-insulated coolant containers 17, 30 while liquid nitrogen is circulated therein. The heat-insulated coolant containers 17, 30 are placed respectively in the grooves 16a, 29a.

The yokes 16 and 29 are each made of a magnetic material, e.g., permendur, a silicon steel plate, iron, or permalloy. The superconducting wires used to form the field coils 18 and 31 are, for example, bismuth or yttrium based high temperature superconducting wires.

The first rotor 12 disposed between the first field side stator 11 and the armature side stator 13 includes a disk-shaped support member 19 which is made of a nonmagnetic material and has a hole 19a for mounting to the drive shaft, a pair of first inductors 20 which are embedded in the support member 19 at point-symmetric positions about the mounting hole 19a, and a pair of second inductors 21 which are embedded in the support member 19 at positions rotated 90° from the positions of the first inductors 20.

The first and second inductors 20, 21 have respectively sector-shaped one end surfaces 20a, 21a which are arranged to face the armature side stator 13 at equal intervals on respective concentric circles and have the same area.

Figure 4A:
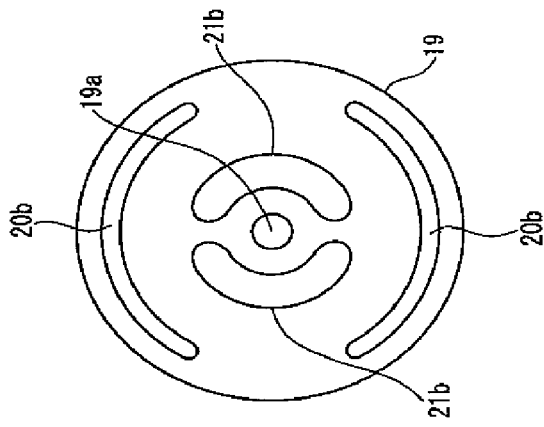
FIG. 4(A) is a front view.
Figure 4B:
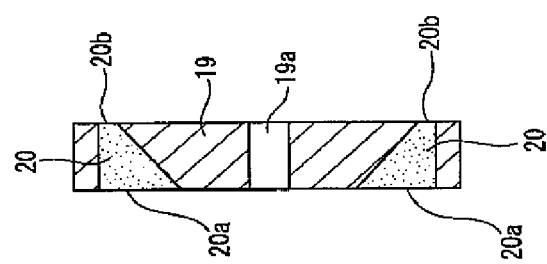
FIG. 4(B) is a sectional view taken along a line C-C.
Figure 4C:
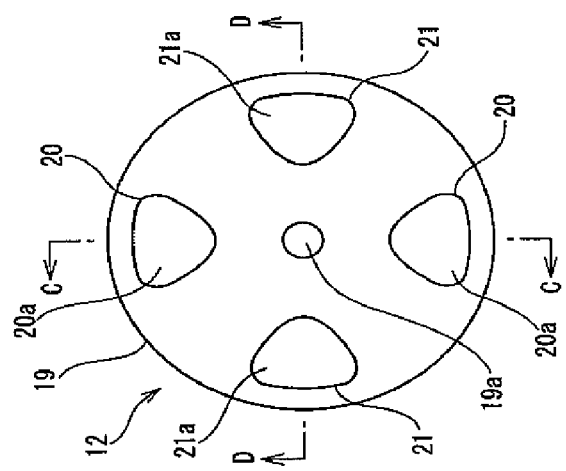
FIG. 4(C) is a rear view.
Figure 4D:
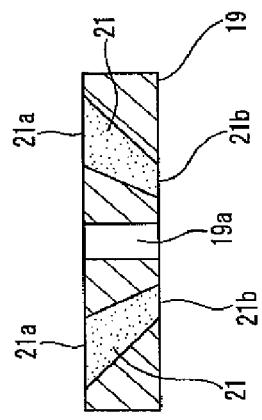
FIG. 4(D) is a sectional view taken along a line D-D.

The other end surfaces 20b of the first inductors 20 are arranged to face an N-pole generating position on the outer peripheral side of the first field coil 18 such that, as shown in FIG. 4(C), they have arc shapes positioned to face the outer peripheral side of the first field coil 18.

The other end surfaces 21b of the second inductors 21 are arranged to face an S-pole generating position on the inner peripheral side of the first field coil 18 such that, as shown in FIG. 4(C), they have arc shapes positioned to face the inner peripheral side of the first field coil 18.

On the other hand, the second rotor 14 disposed between the second field side stator 15 and the armature side stator 13 includes a disk-shaped support member 26 which is made of a nonmagnetic material and has a hole 26a for mounting to the drive shaft, a pair of third inductors 27 which are embedded in the support member 26 at point-symmetric positions about the mounting hole 26a, and a pair of fourth inductors 28 which are embedded in the support member 26 at positions rotated 90° from the positions of the third inductors 27.

The third inductors 27 and the fourth inductors 28 have respectively sector-shaped one end surfaces 27a and 28a which are arranged to face the armature side stator 13 at equal intervals on respective concentric circles and have the same area.

The other end surfaces 27b of the third inductors 27 are arranged to face an S-pole generating position on the inner peripheral side of the second field coil 31 such that, as shown in FIG. 5(C), they have arc shapes positioned to face the inner peripheral side of the second field coil 31.

The other end surfaces 28b of the fourth inductors 28 are arranged to face an N-pole generating position on the outer peripheral side of the second field coil 31 such that, as shown in FIG. 5(C), they have arc shapes positioned to face the outer peripheral side of the second field coil 31.

Thus, the first to fourth inductors 20, 21, 27 and 28 have such three-dimensional shapes that their sectional shapes are continuously changed from the arc-shaped other end surfaces 20b, 21b, 27b and 28b in the axial direction and the one end surfaces 20a, 21a, 27a and 28a each have a sector-like shape. Also, the sectional areas of the first to fourth inductors 20, 21, 27 and 28 are each constant from the other end surfaces 20b, 21b, 27b and 28b to the one end surfaces 20a, 21a, 27a and 28a. Further, the other end surfaces 20b, 28b of the first and fourth inductors 20, 28 have the same area as the other end surfaces 21b, 27b of the second and third inductors 21, 27.

The first inductors 20 of the first rotor 12 and the third inductors 27 of the second rotor 14 are arranged at the same positions in the circumferential direction such that the first and third inductors 20, 27 are opposed to each other with armature coils 24 interposed therebetween. Similarly, the second inductors 21 of the first rotor 12 and the fourth inductors 28 of the second rotor 14 are arranged at the same positions in the circumferential direction such that the second and fourth inductors 21, 28 are opposed to each other with the armature coils 24 interposed therebetween.

The support member 19, 26 is made of a nonmagnetic material, e.g., fiberglass-reinforced plastic (FRP) or stainless steel. The inductors are each made of a magnetic material, e.g., permendur, a silicon steel plate, iron, or permalloy.

Figure 6:
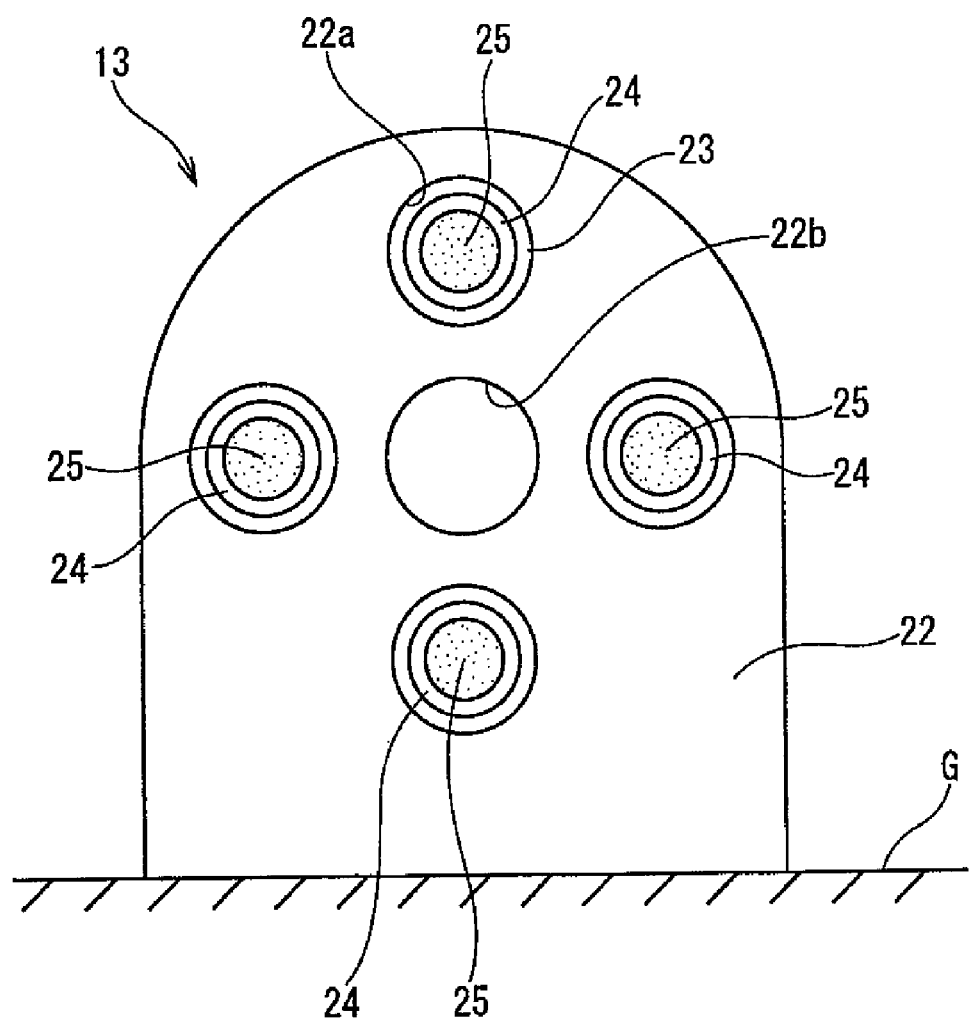
FIG. 6 is a front view of an armature side stator.

As shown in FIGS. 1 and 6, the armature side stator 13 includes a support member 22 which is fixed to the installation surface G and is made of a nonmagnetic material, heat-insulated coolant containers 23 which have a vacuum heat-insulated structure and are embedded in the support member 22, and the armature coils 24 which are windings made of superconducting wires and are held in the heat-insulated coolant containers 23, respectively.

The support member 22 has a loose-fit hole 22b which is bored at its center in size larger than the outer diameter of the drive shaft 34, and four mounting holes 22a which are bored at equal intervals in the circumferential direction about the loose-fit hole 22b. The armature coils 24 are held respectively in the heat-insulated coolant containers 23 while liquid nitrogen is circulated therein, and a flux collector 25 made of a magnetic material is arranged in a hollow portion of each armature coil 24. Four heat-insulated coolant containers 23 holding the armature coils 24 therein are placed respectively in the coil mounting holes 22a.

The flux collector 25 is made of a magnetic material, e.g., permendur, a silicon steel plate, iron, or permalloy. The superconducting wires used to form the armature coils 24 are, for example, bismuth or yttrium based high temperature superconducting wires. Further, the support member 22 is made of a nonmagnetic material, e.g., FRP or stainless steel.

A power feeding device 32 is connected to the first and second field coils 18, 31 and the armature coils 24 through wiring so that DC currents are supplied to the first and second field coils 18, 31 and a three-phase AC current is supplied to the armature coils 24.

A liquid nitrogen tank 33 is connected to the heat-insulated coolant containers 17, 23 and 30 through heat-insulated piping for circulation of liquid nitrogen as a coolant.

The principle for operation of the axial motor 10 will be described below.

When a DC current is supplied to the first field coil 18, an N pole is generated on the outer peripheral side of the first field coil 18 and an S pole is generated on the inner peripheral side thereof. Accordingly, as shown in FIG. 1(A), magnetic fluxes on the N pole side are introduced into the first inductors 20 through the other end surfaces 20b and the introduced N-pole magnetic fluxes appear at the one end surfaces 20a. Also, as shown in FIG. 1(B), magnetic fluxes on the S pole side are introduced into the second inductors 21 through the other end surfaces 21b and the introduced S-pole magnetic fluxes appear at the one end surfaces 21a. Because the other end surfaces 20b and 21b are arranged on the respective concentric circles extending along the outer and inner peripheries of the first field coil 18, it is always ensured the N pole appears at the one end surfaces 20a of the first inductors 20 and the S pole appears at the one end surfaces 21a of the second inductors 21 even with the rotation of the rotor 12.

Based on the same principle, when a DC current is supplied to the second field coil 31, it is always ensured the S pole appears at the one end surfaces 27a of the third inductors 27 and the N pole appears at the one end surfaces 28a of the fourth inductors 28 in the rotor 14.

When a three-phase AC current is supplied to the armature coils 24 in the above state, a rotating magnetic field is generated about the axis of the armature side stator 13 due to phase shifts among the three phases of the supplied AC current. The rotating magnetic field causes torque for each of the first to fourth inductors 20, 21, 27 and 28 of the rotors 12 and 14 about the axis, whereby the rotors 12 and 14 are rotated and the drive shaft 34 is driven for rotation.

Figure 7A:
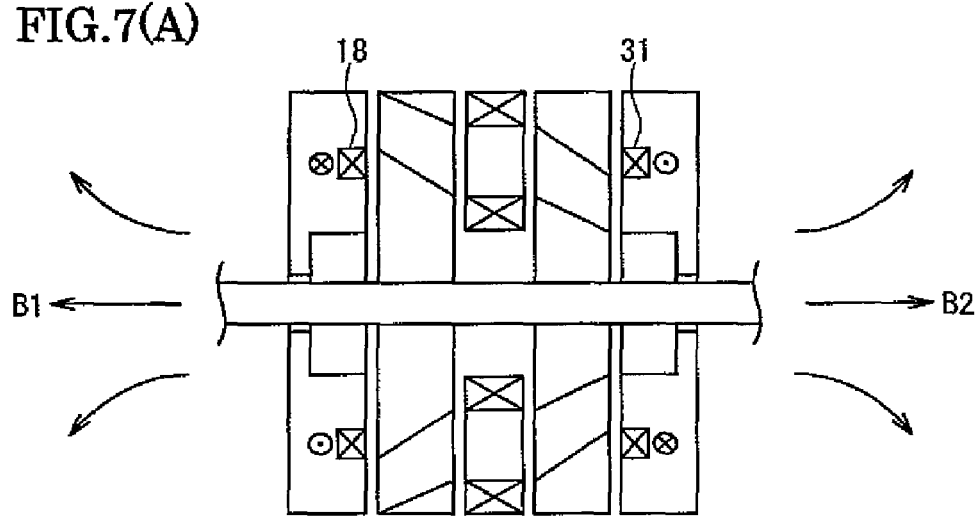
FIG. 7(A) is a schematic view showing a part of magnetic fluxes generated by energization of a field coil.

With the construction described above, as shown in FIG. 7(A), because the currents are supplied to the first field coil 18 and the second field coil 31 in opposed directions, magnetic fluxes B1 and B2 are also generated in opposed directions, as indicated by arrows, in addition to the magnetic fluxes passing through the inductors in the rotors.

Figure 7B:
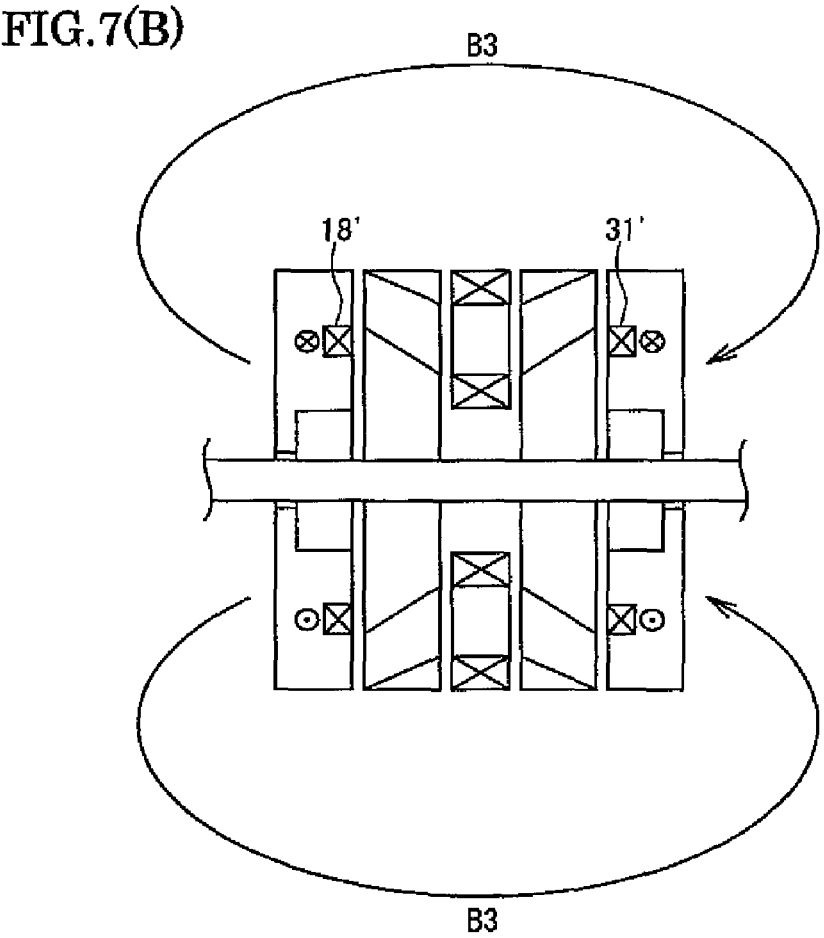
FIG. 7(B) shows a comparative example.
Figure 8:
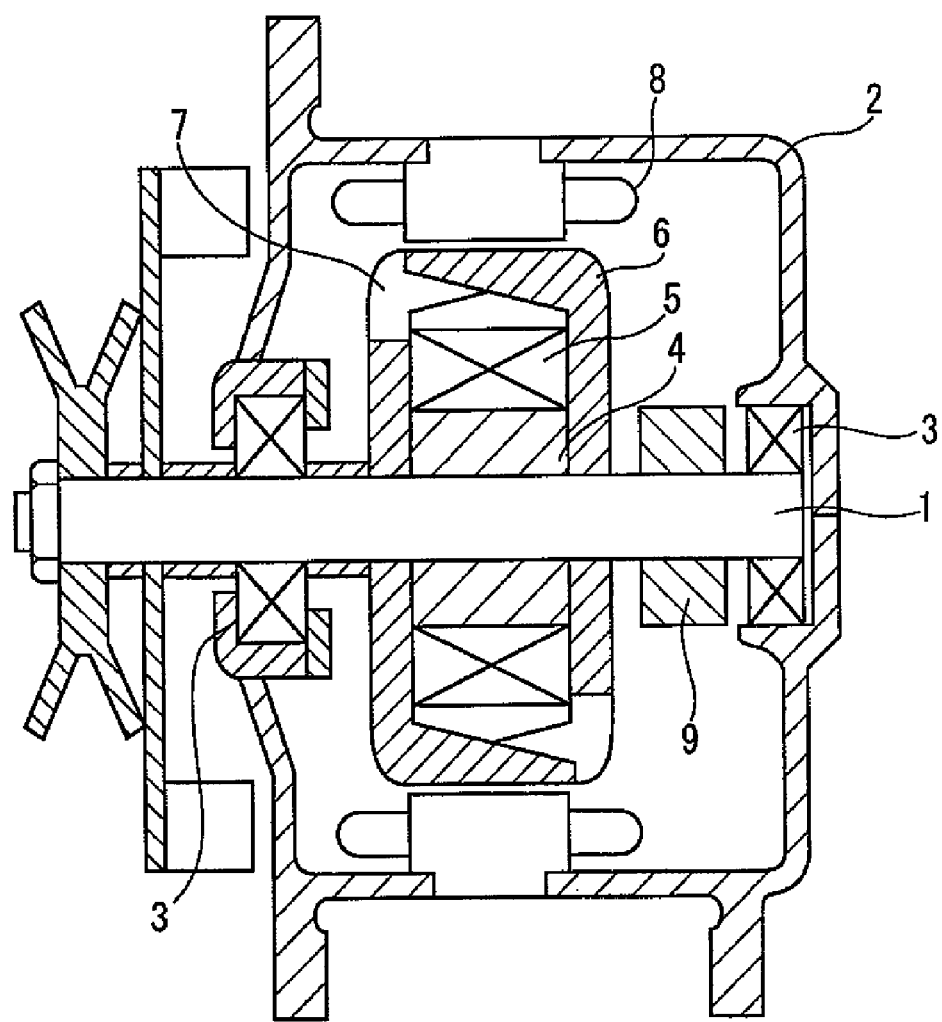
FIG. 8 shows the related art.

On the other hand, as shown in a comparative example of FIG. 7(B), when currents are supplied to a first field coil 18' and a second field coil 31' in the same direction, magnetic fluxes generated by energization of the first field coil 18' act in the same direction as those generated by energization of the second field coil 31', whereby leakage fluxes B3 are generated.

Thus, in the axial motor 10 according to the embodiment, since the currents are supplied to the first field coil 18 and the second field coil 31 in opposed directions, the generation of the leakage fluxes, shown in FIG. 7(B), can be prevented and energy loss can be reduced.

Further, since the first and second field side stators 11, 15 including the first and second field coils 18, 31 attached thereto and the armature side stator including the armature coils 24 attached thereto are not rotated and only the first and second rotors 12, 14 including the first to fourth inductors 20, 21, 27 and 28 fixed thereto are rotated together with the drive shaft 34, a sliding member such as a slip ring is no longer required for the power feeding to the coils 18, 31 and 24. Accordingly, the structure for the power feeding can be simplified and the power feeding can be stabilized. In addition, the motor life can be prolonged.

Incidentally, the first and second field coils 18, 31 or/and the armature coils 24 may be each made of a normal conducting material, e.g., a copper wire. In that case, a cooling structure is not required for the normal conducting wire.

The invention claimed is:

1. An axial motor comprising an armature side stator, a pair of first rotor and second rotor arranged on both sides of the armature side stator and including inductors, and a pair of first field side stator and second field side stator arranged respectively on oppositely spacing sides of the first rotor and the second rotor, which stators and rotors are arranged with gaps left therebetween in an axial direction of a drive shaft, the first and second rotors being mounted to the drive shaft, wherein the armature side stator includes a plurality of armature coils arranged at intervals in a circumferential direction, wherein the first and second field side stators include respectively first and second field coils arranged in a toric form about an axis of the drive shaft, the first and second field coils being supplied with currents in opposed directions, wherein the first rotor includes a first inductor made of a magnetic material and having one end surface positioned to face the armature coil and the other end surface positioned to face the outer peripheral side of the first field coil, and a second inductor made of a magnetic material and having one end surface positioned to face the armature coil and the other end surface positioned to face the inner peripheral side of the first field coil, the first inductor and the second inductor being alternately arranged in the circumferential direction, wherein the second rotor includes a third inductor made of a magnetic material and having one end surface positioned to face the other end surface of the armature coil and the other end surface positioned to face the inner peripheral side of the second field coil, and a fourth inductor made of a magnetic material and having one end surface positioned to face the other end surface of the armature coil and the other end surface positioned to face the outer peripheral side of the second field coil, the third inductor and the fourth inductor being alternately arranged in the circumferential direction, and wherein the first and second field coils included in the first and second field side stators generate magnetic fluxes in opposed directions.

2. The axial motor according to claim 1, wherein the field coils or/and the armature coils are made of a superconducting material.

3. The axial motor according to claim 1, wherein each of the inductors has the same sectional area in a direction perpendicular to the axial direction.

4. The axial motor according to claim 2, wherein each of the inductors has the same sectional area in a direction perpendicular to the axial direction.

* * * * *